United States Patent
Nystad

(10) Patent No.: US 10,269,168 B2
(45) Date of Patent: Apr. 23, 2019

(54) GRAPHICS PROCESSING SYSTEMS

(71) Applicant: ARM Limited, Cambridge (GB)

(72) Inventor: Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/061,480

(22) Filed: Mar. 4, 2016

(65) Prior Publication Data

US 2016/0267702 A1    Sep. 15, 2016

(30) Foreign Application Priority Data

Mar. 9, 2015 (GB) .................................. 1503957.1

(51) Int. Cl.
  *G06T 11/00* (2006.01)
  *G06T 15/04* (2011.01)

(52) U.S. Cl.
  CPC ............ *G06T 15/04* (2013.01); *G06T 11/001* (2013.01)

(58) Field of Classification Search
  CPC ..... G06T 15/04; G06T 11/001; G06T 15/005; G06T 1/60; G09G 5/363
  USPC ........................................................ 345/582
  See application file for complete search history.

(56) References Cited

U.S. PATENT DOCUMENTS

| 6,282,362 | B1* | 8/2001 | Murphy | H04N 5/9201 348/231.3 |
| 7,859,548 | B1 | 12/2010 | Lindholm | |
| 7,884,830 | B1 | 2/2011 | Green | |
| 8,880,571 | B2* | 11/2014 | Srinivasan | H03M 7/24 708/200 |
| 2005/0046638 | A1* | 3/2005 | Shain | G06T 15/00 345/582 |
| 2008/0106549 | A1* | 5/2008 | Newhall, Jr. | G06T 15/04 345/426 |
| 2009/0125607 | A1* | 5/2009 | Rhoads | G06K 9/00442 709/217 |

OTHER PUBLICATIONS

AMD Accelerated Parallel Processing Technology—Reference Guide, "Southern Islands Series Instruction Set Architecture", Revison 1.1, Dec. 2012 (available at: http://developer.amd.com/wordpress/media/2012/12/AMD_Southern_Islands_Instruction_Set_Architecture.pdf , accessed Mar. 3, 2016).
GB Search Report dated Sep. 2, 2015, GB Patent Application No. GB1503957.1.

* cited by examiner

*Primary Examiner* — Gordon G Liu
(74) *Attorney, Agent, or Firm* — Vierra Magen Marcus LLP

(57) ABSTRACT

When sampling a cube map when rendering in a graphics processing system, the vector representation of the desired cube map sample provided by the application is converted into a 2D position on one of the faces of the cube map for use by the texturing unit of the graphics processing pipeline. The determined 2D texture coordinates (S, T) are represented using standard 32-bit IEEE 754 floating point numbers, and the 3-bit face index for the cube map is included in one of the numbers representing the texture coordinates by packing it into the sign bit and the top two bits of the exponent to provide a modified texture coordinate value. The modified 32-bit texture coordinate representation is then provided together with the 32-bit floating point number corresponding to the other texture coordinate as the cube map descriptor to the texturing unit of the graphics processing pipeline.

23 Claims, 9 Drawing Sheets

GRAPHICS PROCESSING SYSTEMS

BACKGROUND

The technology described herein relates to graphics processing systems and in particular to aspects of the operation of graphics processing systems when using textures when rendering.

It is known in graphics processing systems to use graphics textures that represent the colour of the surface of a bounding volume, for example for use for techniques such as so-called "environment mapping". An example of such a texture is a cube texture (a cube map).

In these arrangements, the texture stores one or more colour values for respective directions from a reference position (point) within the volume that the texture represents (and that the texture is defined with respect to), and is sampled by determining a direction from the reference position (point) for (within) the texture to a position on the surface that the texture represents.

Typically, such textures are defined as having multiple faces, with the vector that is used to sample the texture then identifying the "face" to be sampled and the sampling position within that face. For example, in the case of cube mapping, six (square) 2D images are used to form a cube, with each 2D image representing a respective face of the cube map. Each face of the cube has a respective face-index that can be used to identify it.

To use such a multi-faced texture such as a cube map, a 3D unit length direction vector that points from the centre of the texture (e.g. cube) onto one of the faces on the inside of the texture (e.g. cube) is defined (e.g. by the application that requires the graphics processing in question).

However, in order for the graphics processing pipeline to then be able to sample the, e.g. cube, texture when rendering, this vector representation of the desired, e.g. cube map, sample must be converted into a 2D position on one of the faces of the texture, e.g. cube. To do this, the face of the texture, e.g. cube map, that the 3D vector is pointing to is identified, and then the intersection position of the vector on that face is converted to a pair of 2D coordinates (S and T coordinates) within that face.

The 2D position coordinates (the S coordinate and the T coordinate) and the identified texture face (the face index) that the coordinates relate to, are then provided to the texturing unit of the graphics processing pipeline. The graphics processing pipeline texturing unit then reads the colour value from the image (texture) representing the indicated texture face for the position represented by the 2D coordinates.

Similar considerations apply to other forms of environment textures (environment maps). For example, in the case of paraboloid dome texture mapping, the texture will comprise two paraboloid domes, and the graphics processing pipeline will need to be provided with an indication of which "dome" is to be sampled and the position coordinates to be sampled for that dome.

Thus an important aspect of multi-face texture mapping operation in graphics processing pipelines is the provision of the appropriate "texture map descriptor" comprising the texture coordinates (S and T coordinates) and the texture map face index to the graphics processing pipeline.

The Applicants believe that there remains scope for improvements to this aspect of multi-face texture mapping operations.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
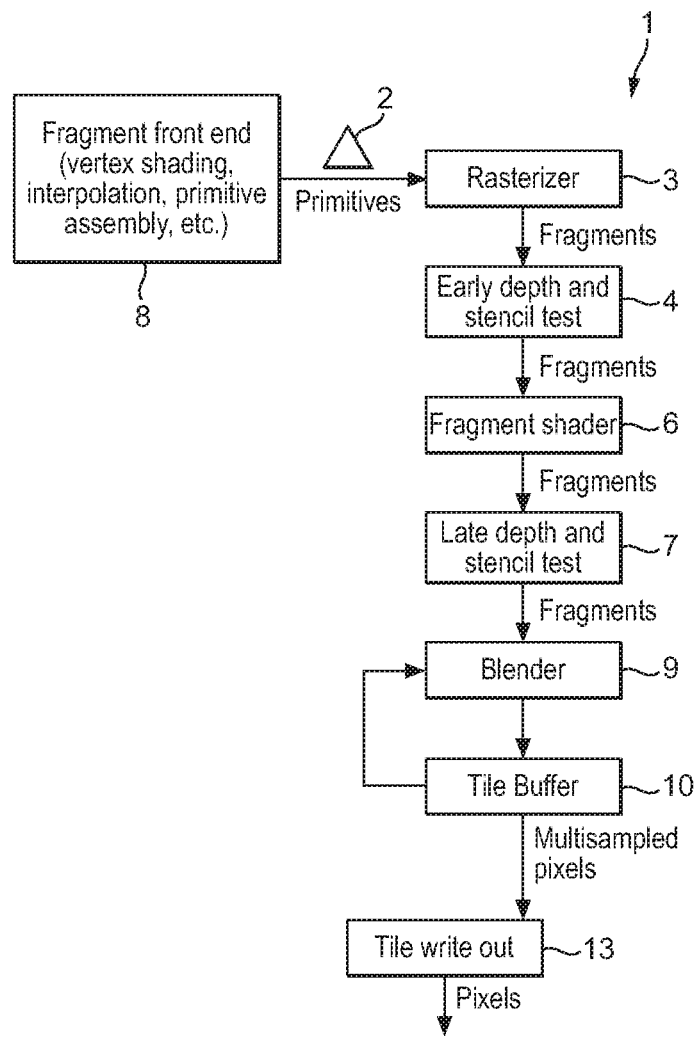
FIG. 1 shows schematically a graphics processing pipeline that can be operated in the manner of the technology described herein.

A first embodiment of the technology described herein comprises a method of operating a graphics processing system when using a multi-face texture that is sampled using a direction vector from a reference position that the texture is defined with respect to, the method comprising:

determining from a direction vector that indicates a desired sampling position of the multi-face texture, the face of the texture that is to be sampled and a pair of texture coordinates indicating the position to be sampled in the determined face;

representing each determined texture coordinate using a predefined format for representing numbers of the graphics processing system; and using one or more of the bits of the representations of the texture coordinates to indicate the face of the texture that is to be sampled.

A second embodiment of the technology described herein comprises a graphics processing pipeline, the graphics processing pipeline comprising processing circuitry configured to:

when the graphics processing pipeline is to sample a multi-face texture that is sampled using a direction vector from a reference position that the texture is defined with respect to when performing graphics processing:

determine from a direction vector that indicates a desired sampling position of a multi-face texture, the face of the texture that is to be sampled and a pair of texture coordinates indicating the position to be sampled in the determined face;

represent each determined texture coordinate using a predefined format for representing numbers of the graphics processing pipeline; and use one or more of the bits of the representations of the texture coordinates to indicate the face of the texture that is to be sampled.

The technology described herein relates to arrangements in which a multi-face texture that is sampled with a vector direction is being used. As discussed above, in order for the texturing unit of the graphics processing pipeline to be able to sample such a texture, the direction vector for sampling the texture that is provided, e.g., by the application requiring the graphics processing, must be converted into 2D texture coordinates and an indication of the face of the texture that the texture coordinates relate to. In the technology described herein, this information is encoded for use by, e.g. the texturing unit of the graphics processing pipeline, using a predefined format for representing numbers of the graphics processing pipeline for the 2D texture co-ordinates, with the indication of the face of the texture to be sampled (i.e. the "face index") being indicated using one or more of the bits of the representations of the texture coordinates.

The Applicants have recognised in this regard that many graphics processing pipelines and systems will be configured to use particular, predefined, formats for representing numbers such as coordinates. For example, many graphics processing pipelines will be configured to use standardised number representations such as 16-bit, 32-bit, or 64-bit floating point number representations.

Furthermore, and as will be discussed in more detail below, the Applicants have recognised that as well as being able to represent the particular texture coordinates using such a predefined number format of the graphics processing system, it is also possible to include an indication of the face (the face index) that is to be sampled within the bit representations of those predefined number formats, whilst still retaining sufficient precision and range for the texture coordinate values for the texturing operation.

This then has the advantage not only of being able to avoid the need to include or provide the face indication (the face index) for the texture as a separate data item to the texturing unit of the graphics processing pipeline (which may be inefficient), but also allows the relevant multi-face texture information (i.e. both the texture coordinates and the face index) to be provided and encoded using a number representation that the graphics processing pipeline is already configured to use and handle. This then means that this information can be processed and used using the processing and programmable logic of the graphics processing pipeline without the need, for example, to provide a specific format for representing the multi-faced texture coordinates and face index which may then need, e.g., the provision of dedicated hardware for this purpose, and/or for additional steps of converting between the multi-faced texture number representations and other number representations that are used in the graphics processing pipeline. In particular, the technology described herein facilitates the use of already provided programmable logic, etc., in the graphics processing pipeline for handling multi-faced texture conversions and descriptors without the need to provide special case operations or hardware for that.

The multi-face texture that is being sampled in the technology described herein can be any suitable and desired multi-face texture, i.e. a texture that has plural (distinct) faces and that is sampled using a direction vector. (Thus, the multi-faced texture will be a texture that indicates and stores for points on a surface that surrounds a reference position that the texture is defined with respect to, one or more colour values for each point, such that the texture can be sampled based on a vector (direction) from the reference position for the texture (that the texture is defined with respect to).)

In an embodiment, the multi-face texture is a cube texture. However, the technology described herein can equally be applied to other forms of multi-face textures such as paraboloid dome textures, a 2D "square map", or a 4D "hypercube map". (In the case of a 2D "square map", for example, there could be four 1D-textures representing the sides of a square, with a 1D-coordinate with a 2-bit index indexing which side in the square to sample. Similarly, for a 4D "hypercube map", there could eight 3D-textures representing the faces of a hypercube, and a 3D coordinate with a 3-bit face index indexing which 3D texture to sample.)

In general, the technology described herein can be used for any form of multi-face texture where the texture has a constrained number of faces and the two-dimensional coordinates that can be sampled within each face are also constrained.

The direction vector that indicates the desired sampling position of the multi-face texture can be determined and provided as desired. It will typically be provided to the graphics processing system by the application that requires the graphics processing operation (e.g. to display a frame).

The determination of the face of the texture that is to be sampled and the texture coordinates indicating the position to be sampled in that face from the direction vector (i.e. the conversion of the 3D direction vector sampling the texture to a 2D position on one of the faces of the texture and a face index representing the face that the direction vector points to) and the encoding of the determined texture coordinates and face index using the predefined number format can be performed in any suitable and desired manner, and by any suitable and desired stage, unit or element of the graphics processing system or pipeline.

In an embodiment, this determination and encoding is performed by a shader core (i.e. a programmable processing stage) of the graphics processing pipeline, e.g. and in an embodiment, using suitable arithmetic instructions (shader code). (Because the texture coordinates and face indication (index) are encoded using predefined format for representing numbers that the graphics processing system already uses, that facilitates using a shader core of the graphics processing pipeline to convert the vector representation of the multi-face texture sampling position to the texture sampling descriptor that the graphics processing pipeline's texture unit will use, and the packing of the texture coordinates and the face indication into the predefined number format.)

Other arrangements, such as using specialised hardware for this determination and for encoding the 2D texture coordinates and face indication in the predefined number format, would be possible, if desired.

The predefined format for representing numbers of the graphics processing system that the determined texture coordinates for sampling the face of the multi-faced texture are encoded using can be any suitable and desired predefined format for representing numbers that the graphics processing system uses. Typically the graphics processing pipeline will support a plurality of different pre-defined number formats, and so one of those formats is in an embodiment selected for use for representing the determined texture coordinates.

In an embodiment, the pre-defined format for representing numbers that is used for the determined texture coordinates is a format that is standardised (e.g. and in an embodiment, by IEEE) for use in graphics processing and/or microprocessor systems more generally.

In an embodiment, the pre-defined format for representing numbers is a pre-defined format for representing floating point numbers. Thus, in an embodiment, each determined texture coordinate is represented using a pre-defined format for representing floating point numbers (and as a floating point number). In this case, any suitable floating point number format (that is used by the graphics processing pipeline in question) can be used, such as FP16, FP32 or FP64. In an embodiment, standard 32-bit IEEE 754 floating point numbers are used for and to represent the determined texture coordinates (i.e. the determined texture coordinates are encoded as 32-bit IEEE 754 floating point numbers).

The bits of the representations of the texture coordinates that are used to indicate the face of the texture that is to be sampled (the face index) can be selected as desired. The number of bits that are used for this purpose is in an embodiment selected based on the number of different faces that may need to be indicated. Thus, for example, in the case of a cube map, in an embodiment three bits of the representations of the texture coordinates are used to indicate the face of the texture that is to be sampled (the face index). For a paraboloid dome texture, only a single bit may need to be used to indicate the face to be sampled.

Where more than one bit of the representations for the texture coordinates is to be used to indicate the face of the texture that is to be sampled, then in one embodiment all the bits that are used to indicate the face of the texture that is to be sampled are taken from the representation of one of the texture coordinates. In another embodiment, the bits that are used to indicate the face of the texture that is to be sampled are distributed across the representations of both of the texture coordinates (i.e. at least one bit of the indication of the face of the texture that is being sampled is present in each representation of a texture coordinate).

The bits that indicate the face of the texture that is to be sampled could be spaced apart in the representations of the texture coordinates, but in another embodiment, a set of consecutive (contiguous) bits in the representations of the texture coordinates is used to indicate the face of the texture that is to be sampled (the face index). This then facilitates identifying and handling the bits that indicate the face of the texture that is to be sampled as a single data item, which may therefore make it easier to pack and unpack the indication of the face of the texture that is to be sampled using the texture coordinate representations. In an embodiment the contiguous sequence of bits that indicate the face of the texture that is to be sampled is present in the representation of one of the texture coordinates, but it would also be possible, if desired, to use a contiguous sequence of bits that spans the representations of the two texture coordinates.

In an embodiment, one or more of the bits of the representations of the texture coordinates are also used to indicate (and can also be used to indicate) an error case (this may arise, e.g., if for some reason an appropriate face of the multi-faced texture cannot be identified from the direction vector that is being used to sample the texture).

Where the bits that are set aside for indicating the face of the texture that is to be sampled have sufficient capacity to additionally indicate an error case, then in an embodiment, one (or more) of the possible encodings that the bits set aside to indicate the face of the texture that is to be sampled can indicate is defined as indicating an error case. This will be the case, for example, where three bits are used to indicate which face of the cube map is to be sampled, as in that case there will be two "spare" bit representations that could be used to indicate error cases. Where the bits being used to indicate the face of the texture that is to be sampled do not have any "spare" capacity, then further bits of the bit representations of the texture coordinates could be set aside for indicating error cases, if desired.

It would also be possible in this regard to use any spare capacity in the bit representations to convey other information in the graphics processing pipeline (e.g. to the texture unit) if desired.

The bits of the representations of the texture coordinates that are used to indicate the face of the texture that is to be sampled can be selected as desired. In an embodiment, a selected, in an embodiment predefined, set of bits from the representations of the texture coordinates is used to indicate the face of the texture that is to be sampled. As discussed above, this selected set of bits may be from the representation of one of the texture coordinates, or could comprise a bit or bits from each texture coordinate representation. In an embodiment, particularly where the bits that are used to indicate the face of the texture are taken from the representation of one of the texture coordinates (a single texture coordinate), then either the topmost bits or the bottommost bits of the representation of the texture coordinate(s) are used. This facilitates identifying and handling the bits of the representations of the texture coordinates that are to be used to indicate the face of the texture that is to be sampled.

The bits of the representations of the texture coordinates that are used to indicate the face of the texture that is to be sampled can be selected as desired. In one embodiment, the appropriate number of least significant bits of the representations of one of the texture coordinates (or of both the texture coordinates) are used to indicate the face of the texture that is to be sampled. Replacing the least significant bits in the representation or representations of the texture coordinates with the face indication (face index) will mean that the effect of including the face indication in the representations of the texture coordinates on the precision of the texture coordinates is reduced. Thus, in the case of using floating point number formats for representing the texture coordinates, in one embodiment, the least significant bits of the mantissa of one or both of the texture coordinates are used to indicate the face of the texture that is to be sampled.

Thus, in the case of a cube map, in one embodiment the three least significant bits of the representation of one of the texture coordinates (e.g. the three least significant mantissa bits) are used to indicate the face of the texture that is to be sampled.

Where the predefined format for representing numbers that is used for the texture coordinates is a signed floating point number format (such as standard 32-bit IEEE 754 floating point number format), then in an embodiment the sign bit of the representation of one or both of the texture coordinates is used for the indication of the face of the texture that is being sampled (to indicate the face index).

The Applicants have recognised in this regard that when using multi-face textures, such as cube maps, the texture coordinates within a given face of the texture (e.g. cube map) will always fall within the range 0-1. This means that there is no requirement to use the sign bit of the floating point number format when indicating the texture coordinates, such that that sign bit can then be used to or for indicating the face of the texture that is to be sampled without any loss of precision in indicating the texture coordinates themselves. Thus, in an embodiment, the sign bit of one or both of the representations of the texture coordinates is used for indicating the face of the texture that is to be sampled.

As will be discussed further below, the Applicants have further recognised that the values of the 2D texture coordinates for a multi-face texture should always be within a range that means that in the case of 32-bit IEEE 754 floating point number format at least, the top bit (bit [7]) of the exponent will always be 0, irrespective of the actual position within the face of the texture that is to be sampled. Thus, again, that top bit of the exponent can be used instead for indicating the face of the texture that is to be sampled, without affecting the precision of the representation of the texture coordinates themselves. Thus, in an embodiment, where the predefined format for representing numbers that is being used to encode the texture coordinates is a floating point number format (and in particular and in an embodiment 32-bit IEEE 754 floating point number format), then the top bit of the exponent is in an embodiment used for indicating the face of the texture that is to be sampled for one or both of the texture coordinates.

The Applicants have further recognised in this regard that, again as a consequence of the way that the texture coordinates are derived and indicated, in the case of a 32-bit IEEE 754 floating point number format at least, the second topmost bit (bit [6]) of the exponent will always be 1 except when the value of the exponent is 0 (i.e. the smallest texture coordinate that is greater than 0 that will need to be represented will always have bit [6] of the exponent set to 1). This will be explained in more detail below. Thus again, the Applicants have recognised that this second topmost bit (bit [6]) of the exponent can be used for indicating the face of the texture that is to be sampled without affecting the precision of the texture coordinate that is being indicated.

Thus, in an embodiment, where the predefined format for representing numbers that is being used to encode the texture coordinates is a floating point number format (and in particular and in an embodiment 32-bit IEEE 754 floating point number format), then the second topmost bit of the exponent is in an embodiment used for indicating the face of the texture that is to be sampled for one or both of the texture coordinates.

Similar considerations apply for other floating point number formats. For example, for FP64 further exponent bits may be able to be used for indicating the face index without affecting the precision of the texture coordinate that is being indicated.

Thus, in an embodiment, where the predefined format for representing numbers that is being used to indicate the texture coordinates is a (signed) floating point number format, then in an embodiment one or more of the sign bits and the exponent bits (and in an embodiment the topmost exponent bits) of the representations of the texture coordinates are used to indicate the face of the texture that is to be sampled. In this case, it would, as discussed above, be possible to use the sign bits of both texture coordinate representations for this purpose, and/or the exponent bits of both texture coordinates for this purpose, but in an embodiment the sign bit and one or more exponent bits of one of the representations of the texture coordinates are used for this purpose. This will then allow, as discussed above, the indication of the face of the texture that is to be sampled (the face index) to be identified and handled as a single data item from the encoded texture coordinates.

In an embodiment, in the case of a cube map, the texture coordinates are represented using standard 32-bit IEEE 754 floating point number format, and the face index (the face of the texture that is to be sampled) is indicated using the sign bit and the top two bits (bits [7:6]) of the exponent of one of the texture coordinates. Thus, the face index for the cube map may be encoded in bits [31:29] of either the S or T coordinate for the sampling position in question.

The arrangement (packing) of the texture coordinates and the bits indicating the face of the texture that is to be sampled in the predefined format for representing numbers of the graphics processing system can be performed in any desired and suitable manner. In an embodiment, the texture coordinates are determined and encoded using the particular predefined number format that is to be used, and then the (selected) bits for one or both of those numbers are replaced with the bits that indicate the face of the texture that is to be sampled.

Other arrangements would, of course, be possible.

The output of this process, and the data that will be provided to the texturing unit of the graphics processing pipeline, will comprise two numbers, each representing a respective texture coordinate (S or T) in a predefined format for representing numbers of the graphics processing system, with one or both of the numbers including in their bit representations bits that encode the face of the texture that is to be sampled (the face index).

Once the texture coordinates and the indication of the face of the texture that is to be sampled have been encoded in the predefined format for representing numbers of the graphics processing system, then the so-encoded texture coordinates and indication of the face of the texture that is to be sampled can be, and are in an embodiment, provided to the texturing unit of the graphics processing pipeline for use to sample the texture when rendering. This can be done in any suitable and desired manner, for example by storing the so-encoded texture coordinates in storage (e.g. memory or registers) accessible to the texture unit of the graphics processing pipeline.

The texturing unit of the graphics processing pipeline can use the so-provided texture coordinates and indication of the face of the texture that is to be sampled, when it is to sample the texture, in any desired and suitable manner, e.g. depending upon exactly how the texture coordinates and the indication of the face of the texture that is to be sampled have been encoded using the predefined number format.

In an embodiment, the graphics texturing unit first identifies and removes the bits of the texture coordinate representations that indicate the face of the texture that is to be sampled (that indicate the face index). This can be done as desired, e.g. by identifying the relevant bit positions in the provided texture coordinate bit representations and determining therefrom the relevant face index. Thus this may comprise, for example, reading the top three bits or, e.g., the three least significant bits, or, e.g., the sign bit or bits and one or more exponent bits, etc., of the provided numbers representing the texture coordinates, and then using (and combining if necessary) those bits to provide the face index to determine the face of the texture that is to be sampled.

Once the relevant face index has been extracted from the bit representations representing the texture coordinates, the texture coordinates themselves can then be determined from the two numbers that are provided to determine the texture position within the indicated face of the texture to be sampled.

Where the representation of a texture coordinate that is provided to the texturing unit of the graphics processing pipeline does not include any bits that are being used to indicate the face of the texture that is to be sampled, then the texture coordinate can simply be used as it is originally provided.

However, where the number indicating a texture coordinate has also been used (i.e. at least some of its bits have also been used) to indicate the face of the texture that is to be sampled, then in an embodiment, that number is first modified before using it as a texture coordinate for sampling the face of the texture.

This is desirable to allow for the fact that the value for the texture coordinate that has been provided to the texturing unit of the graphics processing pipeline has been modified to indicate the face of the texture that is to be sampled, and so may, when it includes bits that have been set to indicate the face index, not in that form actually indicate the correct value of the texture coordinate that is to be sampled.

Thus, in an embodiment, the process comprises modifying the representation of the texture coordinate or coordinates that included the face index to derive a texture coordinate to be used to sample the indicated face of the texture, before then using the texture coordinate to actually sample the indicated face of the texture.

The bit representation for the texture coordinate(s) can be modified in any suitable and desired manner. This process in an embodiment comprises setting the bit or bits of the number indicating the texture coordinates that were used to indicate the face index to a selected, and in an embodiment predefined, value or values. This process can, and in an embodiment does, depend upon how the indication of the face of the texture that is to be sampled has been encoded in the bit representation for the number representing the texture coordinate.

In an embodiment, this modification process comprises replacing one or more of the bits of the representation of the texture coordinate that were used to indicate the face of the texture that is to be sampled with zeros in the representation of the texture coordinate. This will be appropriate where, for example, either the least significant bits of the representation of the texture coordinate, or, in the case of floating point numbers, the sign bit and at least the top bit of the exponent have been used to indicate the face of the texture that is to be sampled.

Thus, in an embodiment, the process comprises replacing one or more of the bits of the representations of the texture coordinates that were used to indicate the face of the texture that is to be sampled with zeros to provide the value that is to be used for the texture coordinate when sampling the face of the texture.

Other arrangements for modifying the bit representation for the texture coordinate before using the value indicated by the bit representation as the texture coordinate for sampling the texture could be used, if desired, and where appropriate.

For example, where, as discussed above, bit [6] of the exponent of a floating point 32-bit number representation is used as a bit for indicating the face of the texture that is to be sampled, then in an embodiment rather than simply setting that bit to 0 once the index value has been read, it is determined whether to set that exponent bit value to 0 or 1 before using the number as the texture coordinate for sampling the texture. This will then help to ensure that the correct value is used for the texture coordinate.

In this case, to facilitate this, in an embodiment the value of bit [6] of the exponent is set to the result of an OR of some or all of the remaining lower bits of the exponent. In this regard, it would be possible simply to OR all the bits of the exponent and then set the bit [6] of the exponent to the result value of that OR operation. Alternatively, the Applicants have recognised the correct value for bit [6] of the exponent could be determined from an OR of bits: [28:26] of the bit representation of the number (i.e. an OR of bits [5:3] of the exponent of the number representing the texture coordinate).

Once the representation(s) of the texture coordinates have been set (adjusted) to take account of the presence of the face index, then those coordinate values (numbers) can be, and are in an embodiment, used as respective (S and T) coordinates for sampling the indicated face of the texture, e.g. to determine the texture value that is to be applied to the sampling point in question. (As discussed above, the face of the texture will be represented (stored) as a 2D image, and so the coordinates will indicate a given position to be sampled within that image.)

The so-sampled texture value can then be used in the texturing operation in any suitable and desired manner (e.g. in the standard manner for the graphics processing pipeline and system in question), e.g. to provide or modify the colour that is being applied to a sampling point that is being rendered.

The technology described herein extends to the above use of a multi-faced texture descriptor that is encoded and packed in the manner of the technology described herein.

Thus, another embodiment of the technology described herein comprises a method of sampling a multi-face texture in a graphics processing pipeline when generating a render output, the method comprising:

receiving a pair of texture coordinates to be used to sample a face of the multi-faced texture in a predefined format for representing numbers of the graphics processing pipeline;

determining from a selected bit or bits of the received representations of the texture coordinates, the face of the multi-face texture that is to be sampled;

setting one or more of the selected bit or bits of the received representations of the texture coordinates that were used to determine the face of the multi-face texture that is to be sampled to a predefined value or values; and sampling the determined face of the multi-face texture using the texture coordinates in their form following the setting step.

Another embodiment of the technology described herein comprises a graphics processing pipeline, the graphics processing pipeline comprising processing circuitry configured to:

when the graphics processing pipeline is to sample a multi-face texture that is sampled using a direction vector from a reference position that the texture is defined with respect to when generating a render output:

determine from a selected bit or bits of a received pair of texture coordinates to be used to sample a face of a multi-faced texture that are in a predefined format for representing numbers of the graphics processing pipeline, the face of the multi-face texture that is to be sampled;

set one or more of the selected bit or bits of the received representations of the texture coordinates that were used to determine the face of the multi-face texture that is to be sampled to a predefined value or values; and sample the determined face of the multi-face texture using the texture coordinates in their form following the setting of one or more of the selected bit or bits of the received representations of the texture coordinates that were used to determine the face of the multi-face texture that is to be sampled to a predefined value or values.

As will be appreciated by those skilled in the art, these embodiments of the technology described herein can, and in an embodiment do, include any one or more or all of the features of the technology described herein described herein, as appropriate.

Thus, for example, the texture coordinates are in an embodiment provided in a floating point number format, and the selected bit or bits that are used to determine the face of the multi-faced texture that is to be sampled are in an embodiment either the least significant bits, or the sign bit or bits and one or more exponent bits of the floating point number representations.

Similarly, the bit or bits of the received texture coordinates that indicate the face index are in an embodiment set in one of the manners discussed above, before they are used to sample the texture.

Equally, the sampled texture value is in an embodiment then used to provide or modify the colour of a sampling point that is being rendered.

Although the technology described herein has been described above with reference to the sampling of a single value from the multi-faced texture, as will be appreciated by those skilled in the art, the technology described herein may be used wherever a value from a multi-faced texture is required, and thus may be repeated, for example, to sample plural values from a given multi-faced texture, and/or to sample plural multi-faced textures, e.g. when rendering a frame for display.

The technology described herein can be used in and with any suitable and desired graphics processing system and pipeline. In an embodiment, the graphics processing pipeline is a tiled-based graphics processing pipeline.

The graphics processing pipeline and system may comprise any suitable and desired processing stages that a graphics processing pipeline may contain. It in an embodiment includes at least a rasteriser that rasterises input primitives to generate graphics fragments to be processed, each graphics fragment having one or more sampling positions associated with it, and a renderer that processes fragments generated by the rasteriser to generate output fragment data.

The rendering processes may include, for example, fragment shading, blending, texture-mapping, etc. In an embodiment the renderer is in the form of or includes a programmable fragment shader.

The graphics processing pipeline may also contain any other suitable and desired processing stages that a graphics processing pipeline may contain such as an early depth (or an early depth and stencil) tester, a late depth (or depth and stencil) tester, a blender, a tile buffer or buffers, a write-out unit, etc.

The graphics processing pipeline in an embodiment also comprises, and/or is in communication with, one or more memories and/or memory devices that store the data described herein, such as the multi-face textures, texture descriptors, etc., and/or that store software for performing the processes described herein. The graphics processing pipeline may also be in communication with a host microprocessor, and/or with a display for displaying images based on the data generated by the graphics processing pipeline.

The graphics processing pipeline in an embodiment includes at least local memory, such as (on-chip) buffer or buffers, and/or register(s), that can be used to store the data required for the texture sampling process and the determined texture values.

The technology described herein can be used for all forms of output that a graphics processing pipeline may be used to generate, such as frames for display, render-to-texture outputs, etc.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired.

Thus, for example, unless otherwise indicated, the various functional elements, stages, etc., of the technology described herein may comprise a suitable processor or processors, controller or controllers, functional units, circuitry, processing logic, microprocessor arrangements, etc., that are operable to perform the various functions, etc., such as appropriately dedicated hardware elements and/or processing circuitry and/or programmable hardware elements and/or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system can otherwise include any one or more or all of the usual functional units, etc., that graphics processing systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that in an embodiment the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in another embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

When a computer graphics image is to be generated, e.g. for display, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 1 shows schematically a graphics processing pipeline 1 that may operate in accordance with the technology described herein. The graphics processing pipeline 1 is a tiled deferred renderer with a fully programmable GPGPU context, for example a renderer which executes partly via Direct Compute, OpenCL, CUDA, etc.

As the graphics processing pipeline 1 shown in FIG. 1 is a tile-based renderer, it will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential. Each tile corresponds to a respective set of screen space sampling positions.)

The render output data array (the render target) may, as is known in the art, typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 8, such as transformation operations (not shown), vertex shading, interpolation and a primitive set-up stage (not shown) to set-up the primitives to be rendered, in response to the commands and vertex data provided to the graphics processor, as is known in the art.

As shown in FIG. 1, this part of the graphics processing pipeline 1 includes a number of stages, including a rasterisation stage 3, an early Z (depth) and stencil test stage 4, a renderer in the form of a fragment shading stage 6, a late Z (depth) and stencil test stage 7, a blending stage 9, a tile buffer 10 and a downsampling and writeout (multisample resolve) stage 13.

The rasterisation stage 3 of the graphics processing pipeline 1 operates, as is known in the art, to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 4 performs, is known in the art, a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by, as is known in the art, comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 10 in the blender 9. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer will store, as is known in the art, colour and depth buffers that store appropriate colour, etc., values or a Z-value, respectively, for each sampling position that the buffers represent (in essence for each sampling position of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The above describes certain features of the operation of the graphics processing system shown in FIG. 1. Further features of the operation of the graphics processing system shown in FIG. 1 in accordance with embodiments of the technology described herein will now be described.

As discussed above, the embodiments of the technology described herein relate to the sampling and use of multi-faced textures, such as cube maps, when rendering in a graphics processing pipeline.

Figure 2:
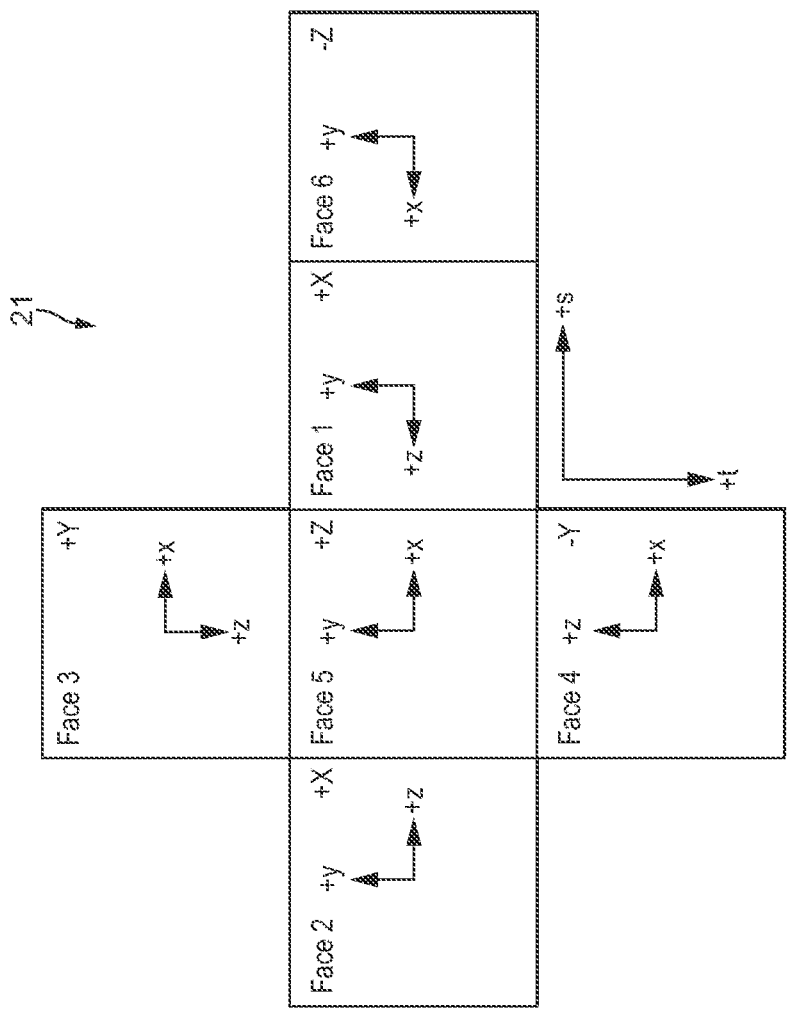
FIG. 2 illustrates a cube map.
Figure 2:
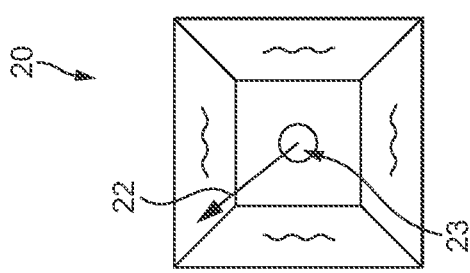

FIG. 2 shows an exemplary cube map 20, together with an expanded view 21 of the cube map 20. As can be seen from FIG. 2, the cube map is made up of six faces (and is stored as six two-dimensional images, each representing one of the faces of the cube). Each face of the cube map has a face index that identifies it (numbered from 0 to 5), and any given position within a face of the cube map 20 can be identified by means of a pair of texture coordinates (S, T).

When it is desired to use a cube map for rendering, for example for so-called environment mapping, the cube map is sampled using a 3D unit length direction vector 22 that points from a reference position 23 within the cube that the cube map 20 represents (typically from the centre of the cube). This direction vector is typically defined by the application that requires the graphics processing in question.

For the graphics processing pipeline to then be able to sample the cube texture when rendering, the vector representation of the desired cube map sample provided by the application must be converted into a 2D position on one of the faces of the cube texture. To do this, the face of the cube map that the 3D vector is pointing to is identified, and then the intersection position of the vector on that face is converted to a pair of 2D coordinates (S, T) within that face. The 2D position coordinates (S, T) and the face index for the face of the cube map that the coordinates relate to are then provided as a cube map descriptor to the texturing unit of the graphics processing pipeline. The texturing unit of the graphics processing pipeline then reads the colour value from the image (texture) representing the indicated cube map face for the position represented by the 2D coordinates (S, T) and uses that colour value in the rendering operation as appropriate.

In the present embodiment, these processes are carried out in the fragment shader 6 of the graphics processing pipeline 1.

Figure 3:
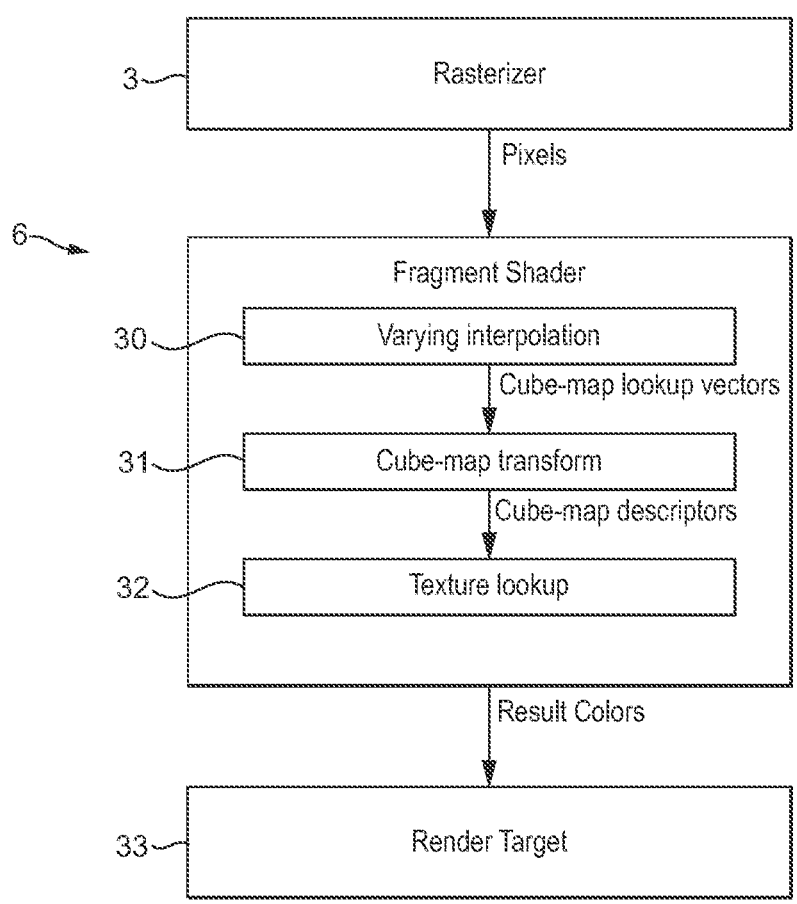
FIG. 3 shows schematically stages of a graphics processing pipeline used in an embodiment of the technology described herein.

FIG. 3 shows schematically the stages of the fragment shader 6 that perform these steps. As shown in FIG. 3, the fragment shader 6 includes a varying interpolation stage 30 that derives the appropriate cube map lookup vectors for the sampling position or positions being considered from the direction vector(s) provided by the application that requires the graphics processing in question.

The appropriate cube map lookup vectors may be derived in any suitable and desired manner. For example, the varying interpolation stage 30 may receive a triangular primitive with one direction vector per vertex as an input, and then perform a weighted average of the three direction vectors to produce one direction vector with which to sample the cube map (with the averaging weights, e.g., depending on the sampling position being considered within the triangle (e.g. such that vertices closer to the sampling position will get larger weights than vertices that are further from the sampling position)). Other arrangements would, of course, be possible.

The cube map lookup vectors are provided to a cube map transform stage 31, that transforms the vectors into the appropriate cube map descriptors including the cube map face index and the texture coordinates (S, T) to be sampled.

The cube map descriptors are provided to a texture lookup stage 32, which samples the appropriate face of the texture using the provided coordinates. This cube map lookup consists of reading the colour of the indicated cube map face at the position represented by the 2D coordinates (S, T) in the cube map descriptor. This lookup could include appropriate filtering (e.g. bilinear filtering) of the texture values, if desired. (If the sampling position is on the edge or corner of the face in question, a seamless filtering process may be performed, in which the colours of neighbouring face(s) are also read and interpolated with the current face.)

The so-sampled colour value from the cube texture is then used in the rendering process as desired, e.g. to provide or modify the colour that is being used for a given sampling position or positions. The resulting colour(s) can then be output to the desired render target 33.

The present embodiments encode the cube map descriptors, comprising the texture coordinates (S, T) and the face index, that are used by the texture lookup stage 32 to sample the cube texture, in a particular way, namely using standard 32-bit IEEE 754 floating point numbers to represent the texture coordinates (S, T), but with the 3-bit face index for the cube map also included in one or both of the numbers representing the texture coordinates. This then allows the entire cube map descriptor, comprising the S and T coordinates and the 3-bit face index, to be packed into a 64-bit word.

Figure 4:
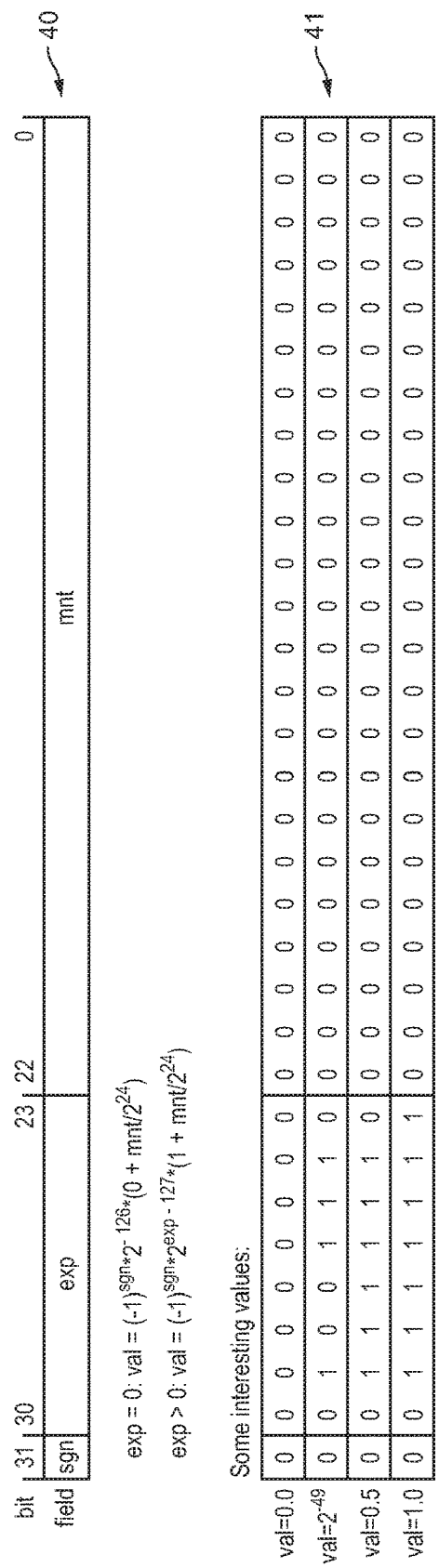
FIG. 4 illustrates the representation of numbers using a floating point format that is used in an embodiment of the technology described herein.

FIG. 4 shows the standard 32-bit IEEE 754 floating point number format 40. As shown in FIG. 4, the 32-bits for the number comprise a sign bit (bit [31]), eight exponent bits (bits [30:23]), and twenty three mantissa bits (bits [22:0]). The way that these values are interpreted and used to determine the floating point number being represented is also shown in FIG. 4.

FIG. 4 also shows how some particular values of interest 41 will be represented in this format, namely the numbers 0.0, 2-49, 0.5 and 1.0. This will be referred to in more detail below.

As discussed above, the Applicants have recognised that it is possible to represent both the S and T coordinates of the cube map descriptor and the 3-bit face index of the cube map descriptor using two such floating point numbers.

Figure 5:
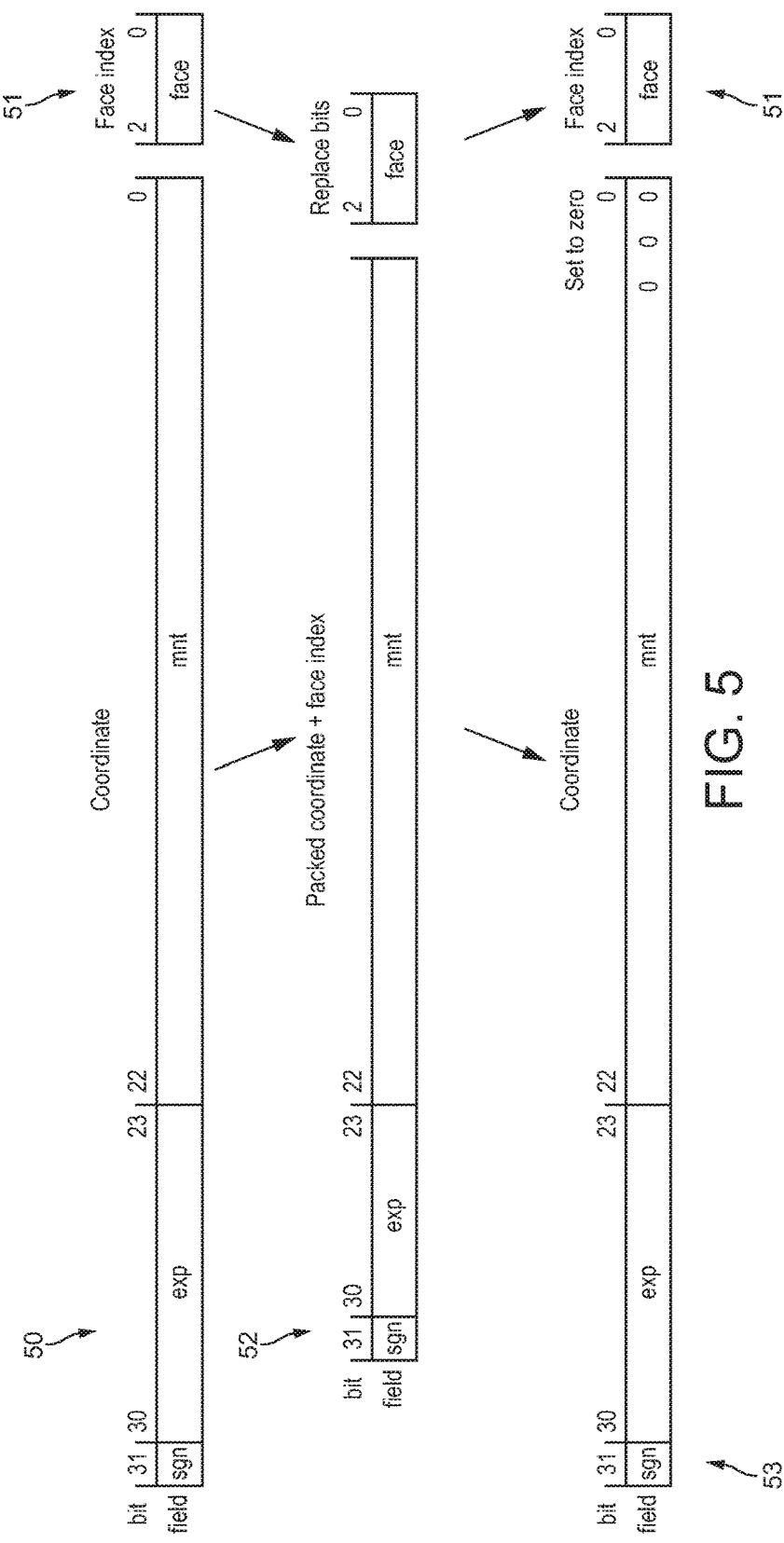
FIG. 5 shows schematically the encoding of a cube map descriptor in a first embodiment of the technology described herein.

FIG. 5 illustrates a first embodiment for doing this.

As shown in FIG. 5, one of the S and T coordinates (such as the S coordinate) that is determined from the sampling direction vector is first represented as a 32-bit floating point number 50. (The other, e.g. T, coordinate is also correspondingly represented as a 32-bit floating point number.) The determined face index is represented as a 3-bit number 51.

In this embodiment, the three least significant bits (bits [2:0]) of the mantissa of one of the texture coordinates 50, e.g. of the S, coordinate, are then replaced with the 3-bit face index 51 to provide a modified, e.g. S, coordinate representation 52. This modified 32-bit, e.g. S, coordinate representation 52 is then provided together with the 32-bit floating point number corresponding to the other, e.g. T, coordinate, as the cube map descriptor to the texture lookup stage 32.

The texture lookup stage 32 then takes the two 32-bit floating point numbers representing the S and T coordinates, and first identifies from the three least significant bits of the S coordinate (or the T coordinate, appropriately) the face index 51 (as shown in FIG. 5). This allows the texture lookup stage to identify the face of the cube map that is to be sampled.

The texture lookup stage then replaces the three least significant bits (bits [2:0]) in the modified, e.g. S, coordinate 52 with zeros (as shown in FIG. 5) to provide a modified version of the, e.g. S, coordinate 53 that is adjusted to allow for the fact that the face index 51 was included in the three least significant bits of the mantissa. The so-modified, e.g. S, coordinate 53 and the provided other, e.g. T, coordinate are then used as the texture coordinates to perform the texture lookup (sample) into the face of the cube texture indicated by the face index 51.

This embodiment may result in some loss of precision in one of the texture coordinates, as the three least significant bits of the mantissa are, as described above, set to zero before using the coordinate to sample the face of the cube texture.

FIGS. 6-9 show a second embodiment that does not lead to any loss of precision in the texture coordinates.

Figure 6:
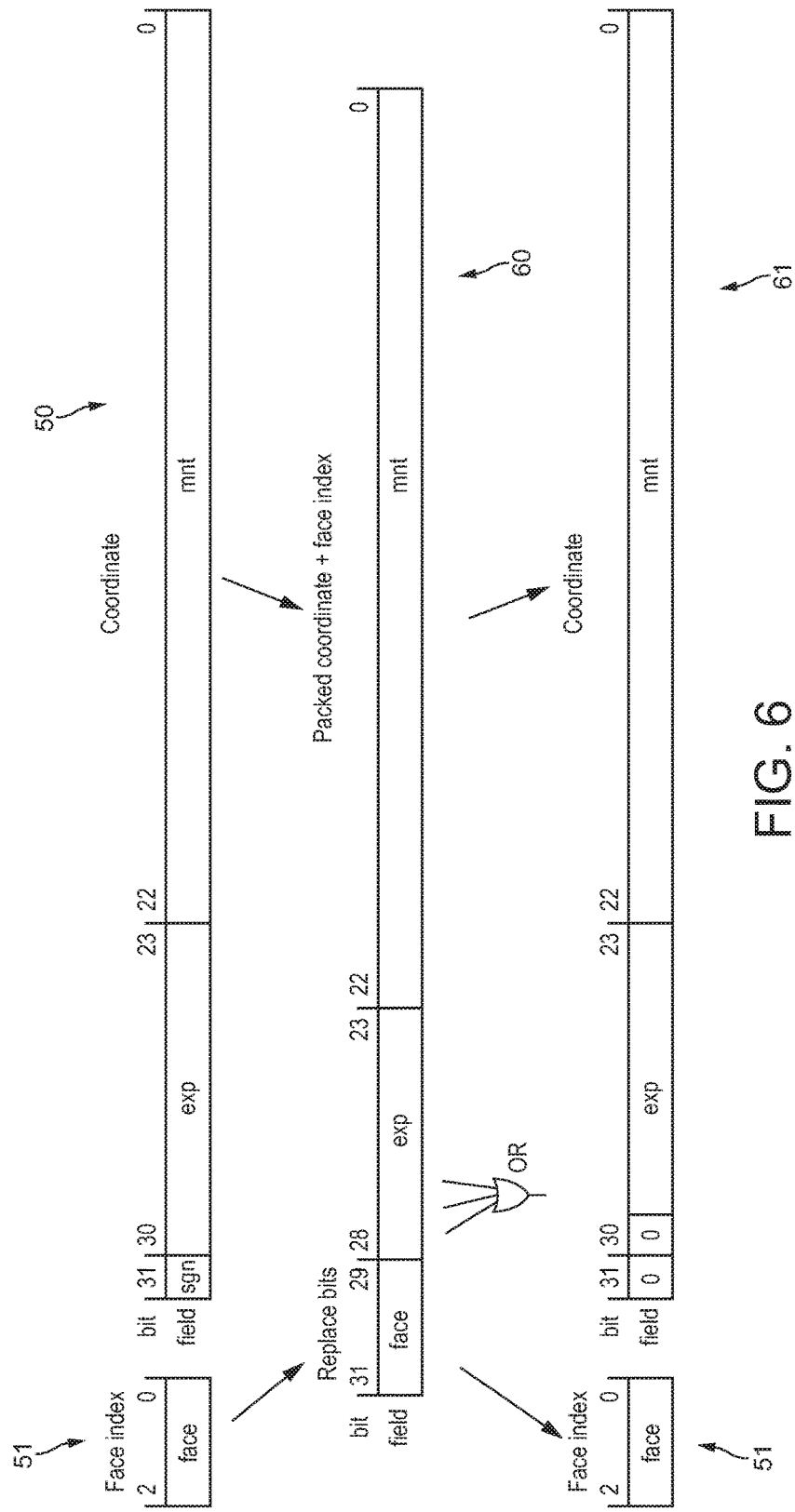
FIG. 6 shows schematically the encoding of a cube map descriptor in a second embodiment of the technology described herein.

In this embodiment, rather than storing the face index 51 in the three least significant bits of the mantissa of one of the texture coordinates, as shown in FIG. 6 the 3-bit face index 51 is instead packed into the sign bit and the top two bits of the exponent (i.e. bits [31:29]) for one of the texture coordinates to provide a modified texture coordinate value 60. As will be explained further below, the Applicants have recognised that the 3-bit face index can be included in these bits of one of the floating point representations of the texture coordinates without any loss of precision in the texture coordinate value itself.

In this arrangement, as shown in FIG. 6, when decoding of the so-packed texture coordinate (e.g. S coordinate), the face index 51 is read from the top three bits (bits [31:29]) of the texture coordinate in question. Then, to adjust that texture coordinate value to allow for the fact that the face index is included in its top three bits, the texture lookup stage first sets the top two bits (i.e. the sign bit and the top bit of the exponent, thus bits [31:30]) of the relevant texture coordinate to 0 (as shown in FIG. 6).

So far as the value of the second top-most bit of the exponent is concerned (bit 29), as will be discussed below, that bit will either take the value 0 when the exponent is exactly 0 or take the value 1 otherwise. To allow for this, as shown in FIG. 6, an OR of other bits of the provided texture, e.g. S, coordinate is used to determine the value of the second top-most bit of the exponent, as that will have the effect of setting that bit either to 0 or 1, depending upon whether the value of the exponent is exactly 0 or not. For this OR operation, all of the bits of the exponent could be OR'd, or, as shown in FIG. 6, the Applicants have recognised that it is in fact only necessary to OR bits [28:26] of the texture coordinate to derive the correct value for bit 29 of the texture coordinate.

The so-modified, e.g., S, coordinate 61 and the provided other, e.g. T, coordinate are then used as the texture coordinates to perform the texture lookup (sample) into the face of the cube texture indicated by the face index 51.

Figure 7:
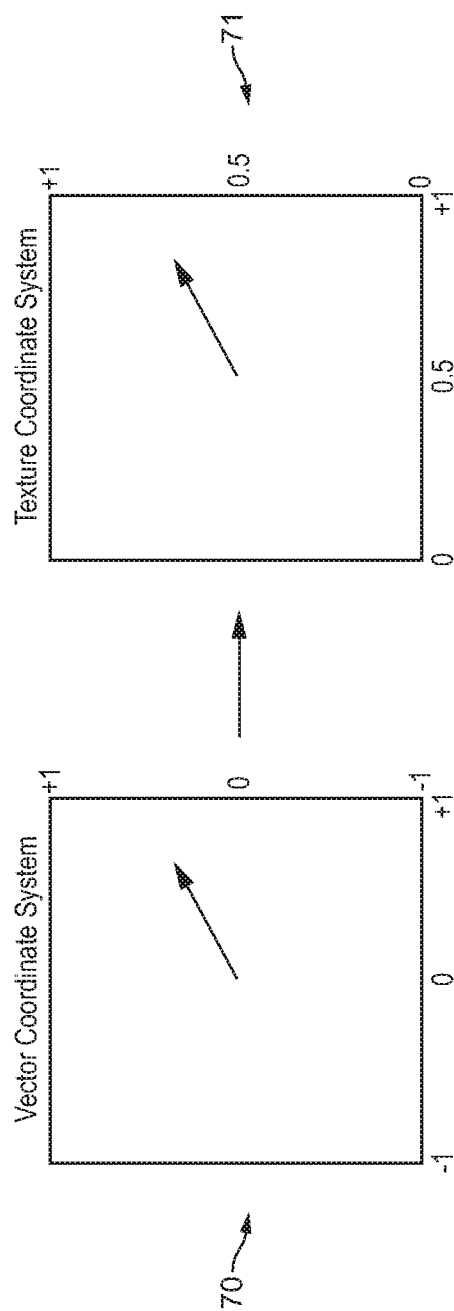
FIGS. 7, 8, and 9 illustrate the operation of the second embodiment of the technology described herein.

FIG. 7 shows schematically the conversion from the vector coordinate 70 system that is used to sample the cube map to the texture coordinate system 71 that is used by the texture lookup stage 32 to sample the cube texture when it is to be used.

As can be seen from FIG. 7, although the vector coordinate system 70 will effectively sample a given face of the cube texture in a range [−1,1], the range of values for the texture coordinates (S, T) that are used to sample the cube texture by the texturing unit of the graphics processing pipeline will be constrained to the range [0,1]. The Applicants have recognised that this has a number of consequences with regard to how the texture coordinates (S, T) could need to be represented using 32-bit floating point format.

Firstly, because the values of the cube map S and T coordinates must be within the range [0,1], the sign bit of the floating point value is not needed to represent the texture coordinates with full precision. This then means that that sign bit can freely be used to encode other information such as the face index, without any loss of precision in the texture coordinate values.

Secondly, the Applicants have recognised that as a consequence of converting the vector coordinate range [−1, +1] to the texture coordinate range [0,1] (which involves multiplying the vector coordinate system values by 0.5 (to convert to the range [−0.5,0.5] (i.e. the values are divided by 2 to halve the range)), and then adding 0.5 (to convert to the range [0,1])), and the limited number of mantissa bits (23-bits) that are available to represent the mantissa for the texture coordinates using 32-bit floating point numbers, the smallest number for a texture coordinate (other than exactly 0) that can be and could need to be represented using a 32-bit floating point number format is constrained, and in practice is effectively 2-52. (As a consequence of this, if the floating point value of either of the texture coordinates is less than 2-52, then its value is set to 0 in the present embodiment.)

This all then means that the cube map coordinates S, T that are able to be and that could need to be represented will all fall within the range {0, [2-52,1]}.

The effect of this then is that when representing the cube map S and T coordinates using 32-bit floating point numbers, the exponent will either be (00000000)2 (where the coordinate is exactly zero) or between the values (01001011)2 and (01111111)2. This then means that bit 7 of the exponent will always be 0, and that bit 6 of the exponent will always be 1 except when the value of the exponent (and of the texture coordinate itself) is 0.

The Applicants have accordingly recognised that this then means that bit 7 and bit 6 of the exponent in the 32-bit floating point numbers indicating the texture coordinates can be used for other purposes without affecting the precision of the texture coordinates that are being represented. Thus, it is possible, as illustrated in FIG. 6, to encode the 3-bit face index for a cube map descriptor in the sign bit and top two exponent bits of a 32-bit floating point number representing one of the texture coordinates (S, T) without any loss of precision in the representation of the texture coordinate itself.

Figure 8:
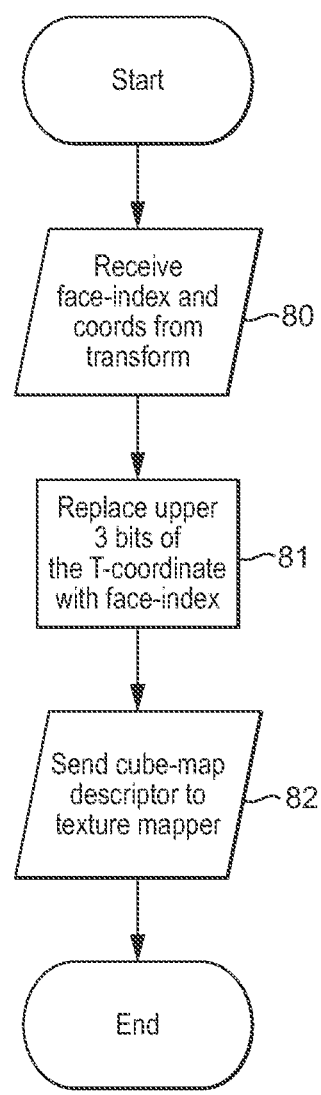

FIG. 8 shows schematically the operation of the cube map transform stage 31 in this embodiment.

As shown in FIG. 8, to pack the face index and S and T coordinates that it has determined from the cube map lookup vectors (step 80) into two 32-bit floating point numbers, the cube map transform stage 31 represents each coordinate as a 32-bit floating point number, and then replaces the upper three bits of the 32-bit floating point representation of one of the texture coordinates (e.g. of the T coordinate) with the 3-bit face index (step 81). (The other texture coordinate, e.g. the S coordinate, will simply be retained in its original 32-bit floating point format.)

The so-modified, e.g. T, coordinate, together with the other, e.g. S, coordinate is then be sent as the cube map descriptor to the texture lookup stage 32 (step 82).

Figure 9:
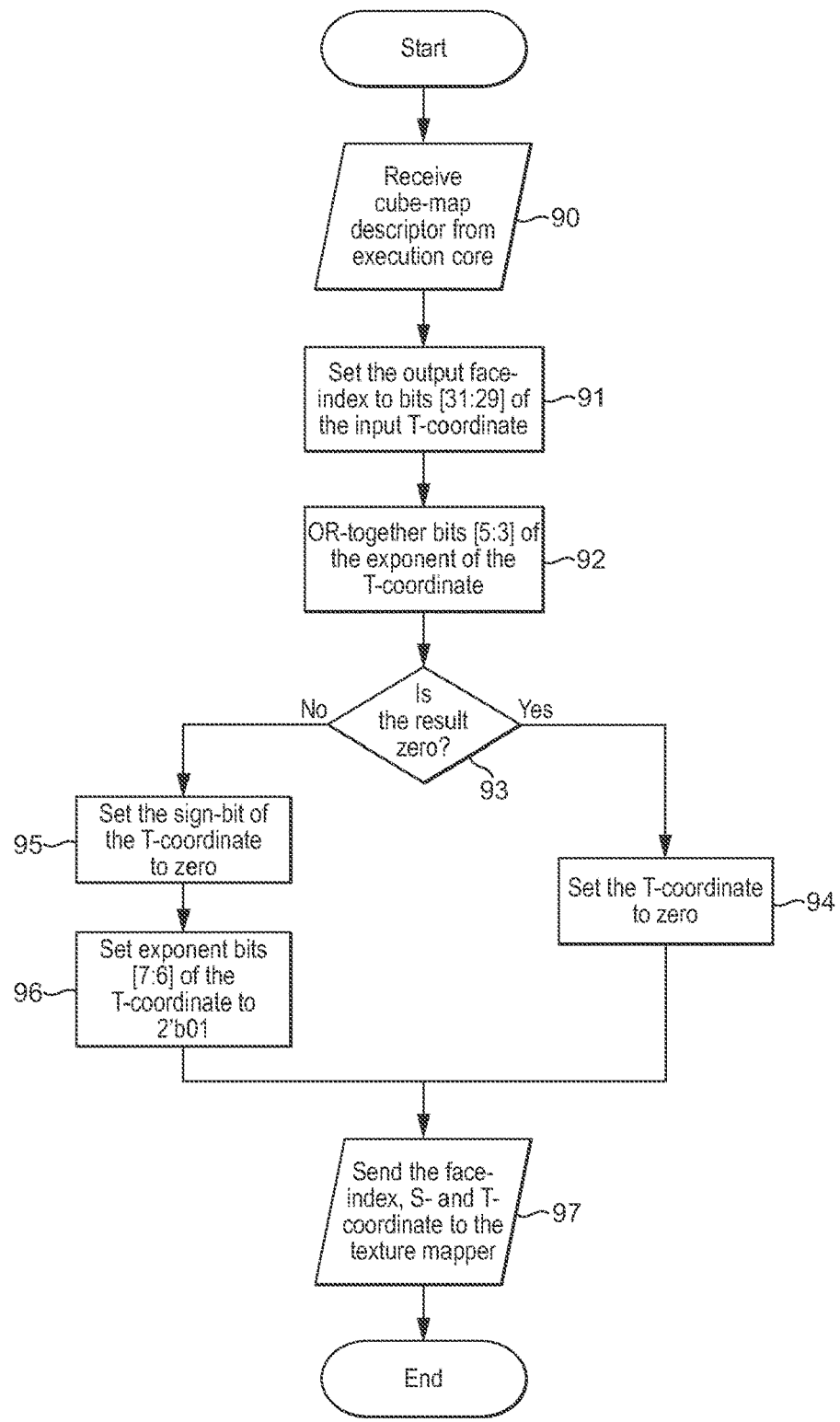

FIG. 9 shows schematically the corresponding operation of the texture lookup stage 32 when it receives the cube map descriptor in this embodiment.

As shown in FIG. 9, when the texture lookup stage 32 receives the cube map descriptor (step 90), it first determines the output face index from bits [31:29] (i.e. the three topmost bits) of the appropriate input texture coordinate (e.g. the T coordinate) (step 91).

The texture lookup stage then ORs together bits [5:3] of the exponent of the, e.g. T, coordinate that the face index was encoded in (step 92) and if the result is 0 (step 93) sets the texture, e.g. T, coordinate in question to 0 (step 94).

On the other hand, if the OR of bits [5:3] of the exponent is not 0, the texture lookup stage sets the sign bit of the texture, e.g. T, coordinate in question to 0 (step 94) and the top two exponent bits (exponent bits [7:6]) of that texture coordinate that the face index was encoded in to 2'b01 (step 96).

The face index, the so-modified texture, e.g. T, coordinate, and the other, e.g. S, coordinate are then used to sample the cube texture in the appropriate manner (step 97). The so-sampled texture value is then used in the rendering (fragment shading) process in the appropriate manner.

In the above embodiments, the face index interface bits are stored as three consecutive bits in one of the texture coordinates. This has the advantage that those bits can then be read and handled as a single "data item". However, other arrangements, such as distributing the face index bits across both texture coordinates and/or between sign and exponent bits and the least significant mantissa bits of one or both of the texture coordinates, would be possible if desired.

Equally, the texture coordinates could be encoded using other number formats, such as 64-bit or 16-bit floating point number formats, with the face index correspondingly being encoded in those number representations in an analogous manner to the manner described above (e.g. using sign and exponent and/or least significant mantissa bits), as appropriate.

Also, although three bits are used in the above embodiments to encode the face index for the cube map, the Applicants have recognised that in fact only six values are needed for indicating the face index. The remaining two values that the 3-bits used for the face index can indicate can be used for other purposes, e.g., and in an embodiment, to indicate error cases. It would also be possible to use other bits of the texture coordinate representations to convey (encode) other information, if desired. For example, 3-bits of one of the texture coordinates could be used to encode the cube map face index in one of the manners discussed above, with 3-bits of the other texture coordinate then being used to encode other information, if desired.

Similarly, although the present embodiments have been described with particular reference to the use of cube maps, the techniques of the present embodiments can correspondingly be used for other forms of multi-faced textures, such as paraboloid dome textures, etc.

It can be seen from the above that the technology described herein comprises a mechanism for encoding both texture coordinates and a face index to be used when sampling a multi-faced texture using standardised number representations that the graphics processing pipeline is otherwise already configured to use. This then facilitates the use and provision of such multi-face texture descriptors without the need, e.g., to provide special formats and/or specialised hardware for that.

This is achieved in the embodiments of the technology described herein by encoding the face index for a multi-face texture using particular, selected bits of floating point number representations of the texture coordinates.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system when using a multi-face texture that is sampled using a direction vector from a reference position that the texture is defined with respect to, the method comprising:
determining from a direction vector that indicates a desired sampling position of the multi-face texture, the face of the texture that is to be sampled and a pair of texture coordinates indicating the position to be sampled in the determined face;
representing each determined texture coordinate using a bit representation corresponding to a predefined format for representing numbers of the graphics processing system; and
replacing one or more bits in the bit representation of one or both texture coordinates with bits of a face index value indicative of the determined face of the texture that is to be sampled, where the face index is represented in a format different from the bit representations of the texture coordinates, to provide modified bit representations of the texture coordinates that encode both the texture coordinates and a face index for the face of the texture that is to be sampled, wherein the modified bit representations of the texture coordinates that encode both the texture coordinates and a face index for the face of the texture that is to be sampled contain the same number of bits as the original bit representations of the texture coordinates;
whereby said modified bit representations of the texture coordinates that encode both the texture coordinates and a face index for the face of the texture that is to be sampled and contain the same number of bits as the original bit representations of the texture coordinates may be used to sample the multi-face texture at the desired sampling position to determine the texture value associated with the sampling position defined by the face index and the texture coordinates.

2. The method of claim 1, wherein the multi-face texture is a cube texture.

3. The method of claim 1, wherein the pre-defined format for representing numbers is a pre-defined format for representing floating point numbers.

4. The method of claim 1, wherein a set of consecutive bits in the bit representation of one or both of the texture coordinates is used to indicate the face of the texture that is to be sampled.

5. The method of claim 1, wherein one or more of the bits of one or both of the bit representations of the texture coordinates are useable to indicate an error case.

6. The method of claim 1, comprising:
using a floating point number format for representing the texture coordinates; and
using the least significant bits of the mantissa of one or both of the texture coordinates to indicate the face of the texture that is to be sampled.

7. The method of claim 1, comprising:
using a signed floating point number format for representing the texture coordinates; and
using one or more of:
the sign bit of one or both of the bit representations of the texture coordinates; and
one or more bits of the exponent of one or both of the bit representations of the texture coordinates;
to indicate the face of the texture that is to be sampled without loss of precision in the texture coordinates.

8. The method of claim 7, wherein:
the multi-face texture is a cube map;
the texture coordinates are represented using 32-bit IEEE 754 floating point number format; and
the face of the texture that is to be sampled is indicated using the sign bit and the top two bits of the exponent of one of the texture coordinates.

9. The method of claim 1, further comprising:
determining from the bits of the bit representations of the texture coordinates that were used to indicate the face of the texture that is to be sampled, the face index of the face of the texture that is to be sampled;
modifying the bit representation of the texture coordinate or coordinates that included the indication of the face of the texture that is to be sampled to derive a modified texture coordinate or coordinates to be used to sample the indicated face of the texture; and
sampling the determined face of the texture using the texture coordinates in their form following the modifying step.

10. The method of claim 9, comprising:
modifying the bit representation of the texture coordinate or coordinates that included the indication of the face of the texture that is to be sampled to derive a modified texture coordinate or coordinates to be used to sample the indicated face of the texture by:
setting the bit or bits of the number indicating the texture coordinate or coordinates that were used to indicate the face of the texture that is to be sampled to a particular value or values.

11. A method of sampling a multi-face texture in a graphics processing pipeline when generating a render output, the method comprising:
receiving bit representations of a pair of texture coordinates to be used to sample a face of the multi-faced texture corresponding to a predefined format for representing numbers of the graphics processing pipeline;
determining from a selected bit or bits of the received bit representations of the texture coordinates, a face index value indicating the face of the multi-face texture that is to be sampled;
replacing one or more of the selected bit or bits of the received bit representations of the texture coordinates that were used to determine the index of the face of the multi-face texture that is to be sampled with a particular value or values to provide modified bit representations of the texture coordinates having the same length as the received bit representations; and
sampling the determined face of the multi-face texture using the texture coordinates determined from the modified bit representations of the texture coordinates following the replacing step in order to determine the texture value associated with the sampling position defined by the face index and the texture coordinates.

12. A graphics processing pipeline, the graphics processing pipeline comprising processing circuitry configured to:
when the graphics processing pipeline is to sample a multi-face texture that is sampled using a direction vector from a reference position that the texture is defined with respect to when performing graphics processing:
determine from a direction vector that indicates a desired sampling position of a multi-face texture, the face of the texture that is to be sampled and a pair of texture coordinates indicating the position to be sampled in the determined face;

represent each determined texture coordinate using a bit representation corresponding to a predefined format for representing numbers of the graphics processing pipeline; and replace one or more bits in the bit representation of one or both texture coordinates with bits of a face index value indicative of the determined face of the texture that is to be sampled, where the face index is represented in a format different from the bit representations of the texture coordinates, to provide modified bit representations of the texture coordinates that encode both the texture coordinates and a face index for the face of the texture that is to be sampled, wherein the modified bit representations of the texture coordinates that encode both the texture coordinates and a face index for the face of the texture that is to be sampled contain the same number of bits as the original bit representations of the texture coordinates;

whereby said modified bit representations of the texture coordinates that encode both the texture coordinates and a face index for the face of the texture that is to be sampled and contain the same number of bits as the original bit representations of the texture coordinates may be used to sample a multi-face texture at the desired sampling position to determine the texture value associated with the sampling position defined by the face index and the texture coordinates.

13. The pipeline of claim 12, wherein the multi-face texture is a cube texture.

14. The pipeline of claim 12, wherein the pre-defined format for representing numbers is a pre-defined format for representing floating point numbers.

15. The pipeline of claim 12, wherein a set of consecutive bits in the bit representation of one or both of the texture coordinates is used to indicate the face of the texture that is to be sampled.

16. The pipeline of claim 12, wherein one or more of the bits of one or both of the bit representations of the texture coordinates are useable to indicate an error case.

17. The pipeline of claim 12, wherein the processing circuitry is configured to:
use a floating point number format for representing the texture coordinates; and
use the least significant bits of the mantissa of one or both of the texture coordinates to indicate the face of the texture that is to be sampled.

18. The pipeline of any claim 12, wherein the processing circuitry is configured to:
use a signed floating point number format for representing the texture coordinates; and
use one or more of:
the sign bit of one or both of the bit representations of the texture coordinates; and
one or more bits of the exponent of one or both of the bit representations of the texture coordinates;
to indicate the face of the texture that is to be sampled without loss of precision in the texture coordinates.

19. The pipeline of claim 18, wherein:
the multi-face texture is a cube map;
the texture coordinates are represented using 32-bit IEEE 754 floating point number format; and
the face of the texture that is to be sampled is indicated using the sign bit and the top two bits of the exponent of one of the texture coordinates.

20. The pipeline of claim 12, wherein the processing circuitry is configured to:

determine from the bits of the bit representations of the texture coordinates that were used to indicate the face of the texture that is to be sampled, the face index of the face of the texture that is to be sampled;

modify the bit representation of the texture coordinate or coordinates that included the indication of the face of the texture that is to be sampled to derive a modified texture coordinate or coordinates to be used to sample the indicated face of the texture; and sample the determined face of the texture using the texture coordinates in their form following the modifying of the bit representation of the texture coordinate or coordinates that included the indication of the face of the texture that is to be sampled to derive a modified texture coordinate or coordinates to be used to sample the indicated face of the texture.

21. The pipeline of claim 12, wherein the processing circuitry is configured to:
modify the bit representation of the texture coordinate or coordinates that included the indication of the face of the texture that is to be sampled to derive a modified texture coordinate or coordinates to be used to sample the indicated face of the texture by:
setting the bit or bits of the number indicating the texture coordinate or coordinates that were used to indicate the face of the texture that is to be sampled to a particular value or values.

22. A graphics processing pipeline, the graphics processing pipeline comprising processing circuitry configured to:
when the graphics processing pipeline is to sample a multi-face texture that is sampled using a direction vector from a reference position that the texture is defined with respect to when generating a render output:
determine from a selected bit or bits of received bit representations of a pair of texture coordinates to be used to sample a face of a multi-faced texture that correspond to a predefined format for representing numbers of the graphics processing pipeline, a face index value indicating the face of the multi-face texture that is to be sampled;
replace one or more of the selected bit or bits of the received bit representations of the texture coordinates that were used to determine the index of the face of the multi-face texture that is to be sampled with a particular value or values to provide modified bit representations of the texture coordinates having the same length as the received bit representations; and
sample the determined face of the multi-face texture using texture coordinates determined from the modified bit representations of the texture coordinates following replacing one or more of the selected bit or bits of the received bit representations of the texture coordinates that were used to determine the face of the multi-face texture that is to be sampled with a predefined value or values in order to determine the texture value associated with the sampling position defined by the face index and the texture coordinates.

23. A computer readable storage medium storing computer software code which when executing on a processor performs a method of operating a graphics processing system when using a multi-face texture that is sampled using a direction vector from a reference position that the texture is defined with respect to, the method comprising:
determining from a direction vector that indicates a desired sampling position of the multi-face texture, the face of the texture that is to be sampled and a pair of texture coordinates indicating the position to be sampled in the determined face;

representing each determined texture coordinate using a bit representation corresponding to a predefined format for representing numbers of the graphics processing system; and replacing one or more bits in the bit representation of one or both texture coordinates with bits of a face index value indicative of the determined face of the texture that is to be sampled, where the face index is represented in a format different from the bit representations of the texture coordinates, to provide modified bit representations of the texture coordinates that encode both the texture coordinates and a face index for the face of the texture that is to be sampled, wherein the modified bit representations of the texture coordinates that encode both the texture coordinates and a face index for the face of the texture that is to be sampled contain the same number of bits as the original bit representations of the texture coordinates;

whereby said modified bit representations of the texture coordinates that encode both the texture coordinates and a face index for the face of the texture that is to be sampled and contain the same number of bits as the original bit representations of the texture coordinates may be used to sample a multi-face texture at the desired sampling position to determine the texture value associated with the sampling position defined by the face index and the texture coordinates.

* * * * *